April 15, 1969 R. J. HAMMOND 3,438,558

TAPE DRIVE ARRANGEMENT WITH SELF-ALIGNING PRESSURE ROLLER

Filed Jan. 20, 1967

Inventor
Robert J. Hammond
By Brown, Jackson, Boettcher & Dienner
Attys.

United States Patent Office 3,438,558
Patented Apr. 15, 1969

3,438,558

TAPE DRIVE ARRANGEMENT WITH SELF-ALIGNING PRESSURE ROLLER

Robert J. Hammond, Stevensville, Mich., assignor to V-M Corporation, Benton Harbor, Mich., a corporation of Michigan Filed Jan. 20, 1967, Ser. No. 610,555
Int. Cl. B65h *17/20*
U.S. Cl. 226—191 10 Claims

ABSTRACT OF THE DISCLOSURE

Structure providing accurate self-alignment of a pressure roller with a tape-driving capstan. The mounting for the pressure roller permits the roller to be moved toward the capstan, to have its axis tilted relative to the axis of the capstan, and to have its axis shifted generally axially relative to the axis of the capstan in order to provide desired alignment.

*Background of the invention*

The present invention relates to a tape drive arrangement with a self-aligning pressure roller. The invention has been devised primarily for use with magnetic tape in a magnetic tape recorder and/or reproducer, but is not limited to such use.

One of the difficulties with prior tape driving arrangements has been the tendency of the tape to deviate from the desired path of travel. This can result, for example, from misalignment between the axes of the roller and capstan and can present very serious problems, particularly in the case of tapes bearing multiple-recordings side by side across the width of the tape. Distortion and other troubles are very likely to arise when such a multiple-track tape, or even a single-track tape, is allowed to deviate from its intended path of travel, since it results in poor recording or reproduction. Heretofore attempts to avoid these difficulties have involved complicated and expensive mechanism.

*Summary*

The primary object of the invention is to provide a low-cost mechanism capable of achieving substantially improved alignment between a pressure roller and a tape-driving capstan, whereby the driven tape will follow the desired path of travle and have uniform speed. Complicated and/or expensive mechanisms or parts for achieving the objective are avoided in the present invention by the use of a simplified structure composed of inexpensive parts. The structure supports the pressure roller for movement in a plurality of planes and is thereby adapted to provide a movement for the pressure roller similar to the movement of a towed trailer (sometimes hereafter referred to as a "trailering action"), when the pressure roller is brought into engagement with the capstan while the capstan is rotating. Because of the manner of its support and since the roller has such a trailering action with respect to the capstan during play, the roller is self-aligning and causes the tape to be driven in the desired path.

Other objects, features and advantages of the invention will appear from the following detailed description of a preferred embodiment thereof.

*Brief description of the views of the drawing*

In the accompanying drawings illustrating such embodiment.

*Detailed description*

Figures 1, 2:
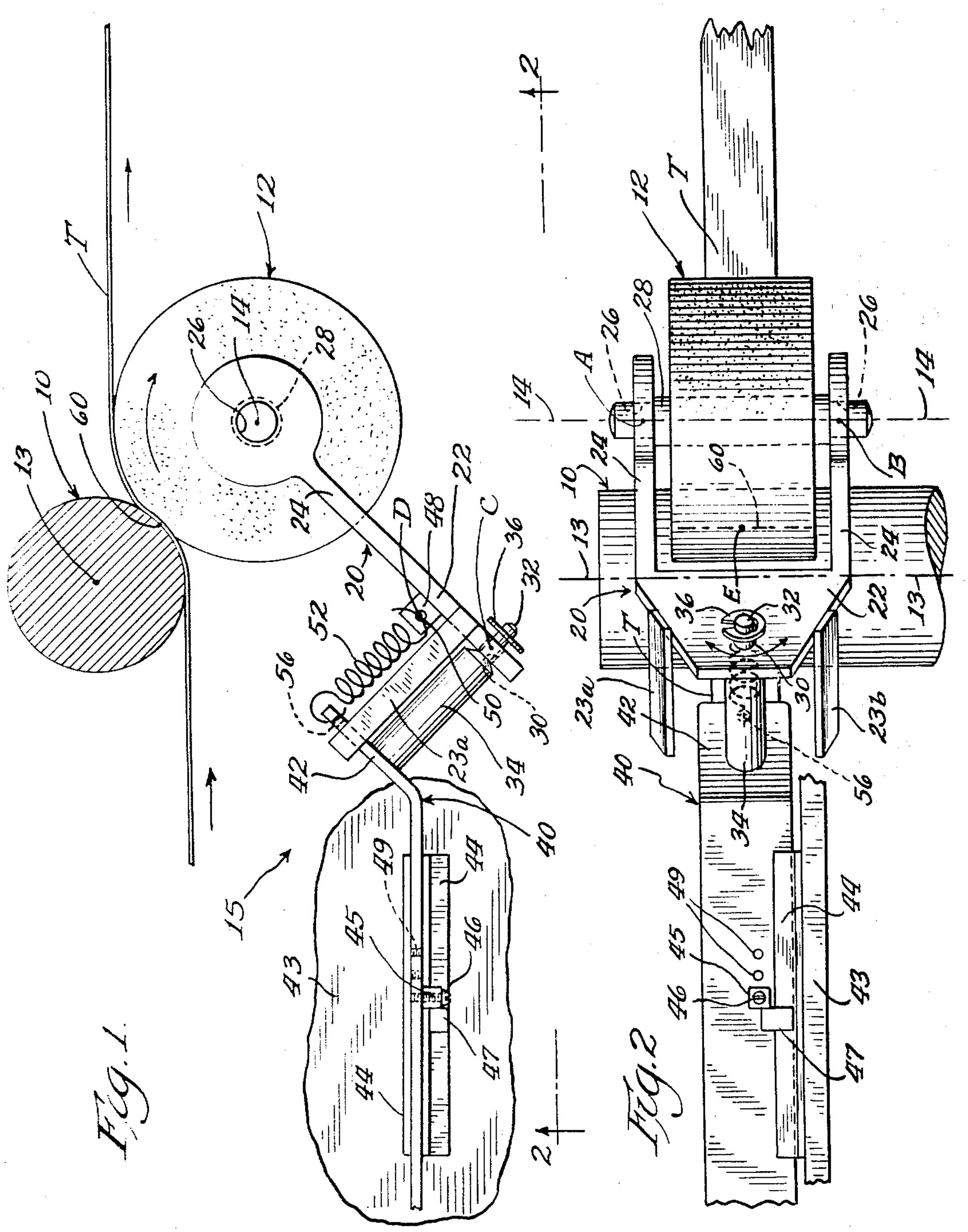
FIGURE 1 is a diagrammatic top-plan view of the structure which is adapted to associate the pressure roller with the tape driving capstan; the position of the pressure roller with respect to the capstan being such that the tape may be driven.
FIGURE 2 is a diagrammatic side elevational view looking in the direction of the arrows 2—2 of FIGURE 1.

Referring to FIGURES 1 and 2, the tape-driving capstan, designated generally by the reference numeral 10, is driven by a motor (not shown) in a known manner. The pressure roller, designated generally by the reference numeral 12, is shown in a position wherein the tape T is pressed against the capstan 10 so that the tape will be driven by the capstan from a supply reel past a head to a take-up reel. The reels and head are omitted since they are conventional and are not necessary to an understanding of the invention. The capstan 10 is made of metal, and the pressure roller 12 may be composed of a resilient material or may have a periphery of such material.

In the illustrated construction the capstan 10 is shown revolving in a counterclockwise direction around the fixed axis 13—13, and the pressure roller 12 is shown revolving in a clockwise direction around its movable axis 14—14. The tape T travels from left to right, as viewed in the drawings, first contacting the capstan 10, then engaging the capstan for a short distance before passing between the capstan 10 and roller 12.

Referring to FIGURE 2, it will be seen that the pressure roller 12 is shown as being wider than the tape T, and the capstan 10 is shown as being substantially wider than the pressure roller 12. Mounted adjacent the capstan 10 and pressure roller 12 is the improved structure, indicated generally by the reference numeral 15, which supports and controls the pressure roller 12.

This structure comprises a bracket 20 having a shank or body portion 22 from which extend two spaced parallel side arms 24 disposed on opposite sides of the pressure roller 12 thereby forming a yoke. The side arms are provided with aligned bearings 26 in which are mounted opposite ends of the supporting shaft 28 of the pressure roller 12.

The plane of the bracket 20 is at an angle relative to the plane of the tape and the bracket extends from the pressure roller 12 to a position where the end of the bracket is opposite and generally parallel to an end portion 42 of a movable support 40 which, in the form shown, is adapted to have movement generally parallel to the plane of the tape, being guided in guideways 44. It will be understood, however, that movable support 40 could have other than a translational movement. For example, it could be pivotally mounted at its left end and be rotated toward the tape to bring the pressure roller into engagement with the capstan. Extending through the end portion of the shank of bracket 20 is a centrally located bearing aperture 30. Passing through this bearing aperture is a bearing pin 32 which is a reduced diameter extension on the end of bearing post 34 and provides a pivotal support for the bracket 20. The fit of the bearing pin 32 in the bearing aperture 30 is such as will permit the bracket 20 to have pivotal movement in all directions around the pin. That is, it can have universal movement around the pin as a center within limits set by the size of the aperture 30. The bracket 20 may rotate around the pin 32 within limits set by the flanges, or stops, 23*a* and 23*b*, which are formed generally at right angles to the body portion 22 of bracket 20 and of a length to overlie and underlie flange 42 of movable support 40. The bracket 20 may also have cocking or tilting movement toward the longitudinal axis of the pin. This in turn permits the axis 14—14 of roller 12 to move into its aligned position relative to the axis of the capstan 10. A C-shaped retaining washer 36 serves to prevent the shank of bracket 20 from sliding off the end of the bearing pin 32.

The other end of the bearing post 34 is anchored in the end portion, or flange 42 of the movable support 40. Support 40, which has sliding motion in a longitudinally extending guideway 44, which is carried on a base 43, can be shifted to right or left for thereby, respectively, disengaging or engaging the pressure roller 12 with the tape T and capstan 10. Any suitable means may be provided for moving the support 40. Cooperating stops 45 and 47 on the support member 40 and guideway 44, respectively, limit movement of the support member 40 (and therefore limit movement of the pressure roller 12) to the left as viewed in FIGURE 1. Either stop, such as stop 45 for example, can be made adjustable so that the tension in spring 52 may be varied, by having it securable by a screw 46 in one of a plurality of threaded holes 49.

The bearing comprising the aperture 30 and pin 32 may be referred to as a "towing" connection (the imaginary center of which may be designated C) and the connection pulls the pressure roll 12 as a trailer when movable support 40 moves to the left as shown in FIGURE 1. FIGURE 1 shows the pressure roller after it has been brought into engagement with the tape and capstan 10 for permitting the tape to be driven. If roller 12 when it is initially brought into engagement with capstan 10 is tilted downwardly (clockwise about C as viewed in FIGURE 2), the frictional engagement between the surface of the rotating capstan and the surface of the pressure roller 12, will drive the latter upwardly into alignment so that the axes are in the same plane. This action is what I have called the "trailering action." This will result in uniform distribution of pressure across the line of contact between capstan 10 and pressure roller 12. If each is a true cylinder their axes will not only be in the same plane but also will be parallel, but that is not so important as having uniform pressure across the line of contact. To provide the trailering action it will be observed that point C is located on the feeding-in side of the tape relative to the capstan and roller.

Projecting from the side of the shank 22 is a lug 48 having an aperture 50 therein in which is hooked one end of resilient means in the form of a tension spring 52. The other end of this tension spring is hooked in an aperture 56 in the end of the flange 42. Preferably the axis of spring 52 will be approximately parallel to the bearing pin 32 when the capstan 10 and roller 12 are in contact and are aligned. The aperture 50 in which the end of the tension spring is hooked will be referred to as point D and it represents the point of application of force of spring 52 on bracket 22. Centers of bearing supports 26 which support the roller's shaft 28 at either end of the roller will be referred to, for later descriptive convenience, as points A and B and they lie on the axis 14—14.

The desired line of contact 60 (FIG. 1) of the tape T with capstan 10 is in the same plane as the axis of the capstan 10. Due to the resilient surface of the roller 12 its engagement with the tape and capstan involves an area rather than a line, but for convenience it will also be called a line contact. When the capstan and pressure roller are perfect cylinders the lines of contact are parallel to their axes 13—13 and 14—14, respectively. The center of the pivotal connection 30–32, previously called point C, lies in a plane defined by it and points of roller support A and B (which lie on axis 14—14). That plane is substantially perpendicular to a second plane defined by the axes 13—13 and 14—14 of the capstan and roller, respectively, when the latter structures are engaged and aligned at the desired line of contact 60. As noted earlier point C lies on the feeding-in side of the capstan and roller to provide the trailering action.

Point C and point D—the latter being the point of application of force of spring 52 which biases the bracket 20 so as to urge roller 12 toward the capstan—lie in a third plane which includes the center point E of the desired line of contact 60. That third plane is perpendicular to the longitudinal median line of bracket 20 and therefore passes through the center of the axis 14—14 of the roller 12, which is midway between bearing points A and B. Point D preferably also lies on a line joining points C and E.

By reason of the construction and arrangement of the parts as described above, it will be seen that the torque exerted by spring 52 on bracket 22 will cause the roller 12 to frictionally engage the surface of the capstan. Since the point D of application of force of the spring 52 lies on a line between the pivot point C and the midpoint E of the line of contact 60 between the roller and capstan, uniform distribution of pressure across the line of contact 60 will result. Prior art structures show methods of accomplishing such uniform distribution of pressure across the line of contact and, if axes of the roller and capstan are in the same plane at this time, adequate drive will result. But if the axes are not in the same plane due to inaccuracies or mechanical tolerances in the construction, then adequate drive will not result. But the trailering action provided by my invention (not found in the prior art) alignment of the axes in the same plane is assured. Therefore my invention assures self-alignment of the axes of the presure roller and capstan in the same plane, along with uniform distribution of pressure across the line of contact.

While I have disclosed a preferred embodiment of my invention I do not intend to be limited thereto, except insofar as the claims are so limited, since various modifications or changes will occur to one skilled in the art who has my disclosure before him.

I claim:

1. For use in a tape driving mechanism for a tape recorder or the like having a driven capstan for driving the tape, the improvement comprising a shiftable pressure roller adapted to engage the tape and press it against the capstan, a structure for supporting the pressure roller at its opposite ends on its axis of rotation, a movable support for said structure, a universal pivotal connection between said structure and said movable support, said movable support being adapted to move the roller toward engagement with the tape and capstan, and resilient means biasing the pivotally connected structure in a direction toward said capstan.

2. The improvement of claim 1 wherein the pivotal connection is on the feeding-in side of the capstan and roller, and the structure for supporting the pressure roller provides a freely trailering action of said roller when it engages the rotating capstan.

3. The improvement of claim 2 wherein the resilient means is a spring acting between said structure and said movable support, and wherein the rest position of said movable support, when the roller engages the tape against the capstan, is such that the spring is placed under tension.

4. The improvement of claim 3 together with adjustable stop means adapted to vary the rest position of said movable support and thereby to vary the spring tension.

5. The improvement of claim 2 wherein the center of said pivotal connection lies in a first plane which includes the axis of the roller and is substantially perpendicular to a second plane defined by the axes of the capstan and roller when they are engaged and aligned.

6. The improvement of claim 5 wherein the center of pivotal connection and the spring's point of application of force on said structure lie in a third plane which includes the center point of the line of contact of the capstan and roller, and wherein said third plane is perpendicular to said first plane and includes the midpoint on the axis of said roller.

7. The improvement of claim 3 wherein the spring's point of application of force lies on a line joining the center of pivotal connection and the center point of the line of contact of the capstan and pressure roller.

8. The improvement of claim 2 wherein the pivotal connection comprises a pin and the structure for supporting the pressure roller has an aperture disposed around said pin and so dimensioned relative to said pin as to permit said supporting structure to tilt in a plurality of directions and also to have rotational movement about the pin, 9. The improvement of claim 8 wherein stops are provided to limit rotational movement of said supporting structure about said pin.

10. The improvement of claim 8 wherein the resilient means is a coil spring having its axis substantially parallel to the axis of said pin when the capstan and pressure roller are in engagement and aligned in the same plane.

References Cited

UNITED STATES PATENTS

| | | | |
|---|---|---|---|
| 2,788,209 | 4/1957 | Montijo | 226—186 |
| 2,988,257 | 6/1961 | Lasarev et al. | 226—187 |
| 3,107,835 | 10/1963 | Hardy et al. | 226—180 X |
| 3,136,464 | 6/1964 | Schmid | 226—180 |
| 3,164,331 | 1/1965 | Hardy | 226—180 |
| 3,233,807 | 2/1966 | Wray | 226—190 X |
| 3,248,066 | 4/1966 | Andrews | 226—180 |
| 3,269,626 | 8/1966 | Albrecht | 226—180 X |
| 3,298,583 | 1/1967 | Weathers et al. | 226—180 X |
| 3,339,816 | 9/1967 | Akira Iribe | 226—194 X |

ALLEN N. KNOWLES, *Primary Examiner.*

U.S. Cl. X.R.

226—194